United States Patent Office 3,242,220
Patented Mar. 22, 1966

3,242,220
PREPARATION OF BISPHENOLS
Francis N. Apel, Nutley, Louis B. Conte, Jr., Newark, and Howard L. Bender, Sparta, N.J., assignors to Union Carbide Corporation, a corporation of New York
No Drawing. Filed Oct. 20, 1958, Ser. No. 768,093
6 Claims. (Cl. 260—619)

This invention relates to the preparation of alkylidene bisphenols from phenols and aldehydes and more particularly to a cataylst useful in the preparation of bisphenols from phenol and aldehydes.

Methods presently known for the preparation of bisphenols on a commercial scale commonly use strong mineral acids, such as aqueous or anhydrous hydrochloric and aqueous sulfuric acids, as condensation catalysts. These mineral acid catalysts are unsatisfactory for a number of reasons: First, the high cost of the corrosion resistant apparatus required; secondly, the acid is progressively diluted with the water produced by the condensation reaction and catalytic effectiveness of the acid is correspondingly decreased. This results in reduced rates of reaction and smaller yields of the bisphenol product; thirdly, the presence of soluble acids in the product brings about a number of undesirable side-reactions which contaminate the bisphenol with by-products and salts which can be removed only by complex purification procedures. Oftentimes, if there are even traces of soluble acid present, purification steps to remove unreacted phenol require costly high vacuum techniques. Additionally, the acid catalyst must be neutralized before separation of the products can be effected.

We have now discovered a highly desirable and satisfactory process for the production of bisphenols which avoids the difficulties encoutered in the heretofore known processes. It has now been found that the condensation of phenols and aldehydes to produce bisphenols can be accomplished by use of a substantially insoluble acidic ion exchange resin. Generally speaking, these catalysts are cationic exchanging groups chemically bound to polymeric resins. Preferred are cation exchanging groups such as sulfonic acid groups which exhibit a strong exchange potential with basic ions.

Primary among the advantages provided by the ion exchange resin catalyst are (1) ease of separation of the catalyst from the reaction mixtures, e.g., by filtration or decantation, resulting in the elimination of the neutralization step required in homogeneous mineral acid catalyzed reaction systems and (2) a reduced number of undesirable side-reactions. Other benefits are the absence of catalyst residues in the reaction product, satisfactory reaction rates at lower temperatures, increased efficiency of reaction, elimination of reaction vessel corrosion problems and adaptability of the process to continuous operation.

The number and nature of acidic groups which are available for contact with the reactants determines the catalytic effectiveness of the ion exchange resin. Thus, although the number of acidic groups located on the polymeric skeleton of the resin determines the exchange capacity of the resins, a more accurate criterion of catalytic effectiveness is the number of acidic groups available for contact with the reactants. This contact can occur only on the surfaces of the ion exchange resin. Therefore, a form of resin which provides a maximum amount of surface, e.g., porous microspheres of beads, is highly desirable, but the particular form used is not critical. Porous resin structures are satisfactory where the size of the pores is sufficient to permit substantially free passage of the large bisphenol molecules.

Although the particular polymer structure is not narrowly critical for the resin catalysts of this invention, the structure should be such as will render the resin substantially insoluble in the reaction mixture and in any solvent to which the resin may normally be exposed. Resin insolubility is generally due to a high degree of cross-linking within the resin but insolubility can be influenced by other factors, e.g., the molecular weight and/or the degree of crystallinity in the polymer.

In general, the higher the exchange capacity of a resin, i.e., the greater the number of milliequivalents of acid per gram of dry resin, the more desirable the resin is for use in our process. Resins having an exchange capacity above 2 milliequivalents per gram of dry resin are preferred in our invention. Ion exchange resins with which highly successful results have been obtained include: sulfonated styrene-divinylbenzene copolymers, sulfonated cross-linked styrene polymers, phenol-formaldehyde sulfonic acid resins, benzene-formaldehyde-sulfonic acid resins, and the like. Some of these resins are sold commercially under trade names such as Amberlite XE–100 of Rohm and Haas Co., Dow Chemical Co.'s Dowex 50–X–4, Permutit Co.'s Permutit QH and Chemical Process Co.'s Chempro C–20.

Many ion exchange resins are sold in the form of the sodium salt or other salt and are converted to the acid or hydrogen form prior to use in this process. The conversion is easily accomplished by washing the resin with a suitable acid, e.g., sulfonated resins can be washed with sulfuric acid solution. The salts formed during the washing procedure are conveniently washed from the resin with water or other solvents.

Water is often dispersed throughout the polymeric structure as a result of either washing the polymer free of salts or the shipping of the resin, wetted with water, from the manufacturer, or both. The water content can be as much as 50 to 100% by weight based on the dry resin. It is preferred, in order to avoid unnecessary dilution of the reactants and to facilitate removal of the bisphenol from the reaction products, to remove this water from the resin. Water can be removed by drying the resin under vacuum or in an oven. A preferred method is displacement of the water with phenol, either by diffusion or distillation techniques. In the former, a substantially dry ion exchange resin is soaked in melted anhydrous phenol for a time sufficient to fill the resin interspaces with phenol while the latter is conveniently accomplished by azeotropic distillation in the presence of excess phenol.

The above-described resin catalysts are effective in promoting the condensation of phenols having a reactive, substantially unhindered hydrogen atom in the ring position para to the phenolic hydroxyl; with or without one or more substituents in the positions ortho and meta to the phenolic hydroxyl. Condensation of halogen substituted phenols, such as ortho and meta chlorophenol, 2,6-dibromophenol and the like, and phenols substituted with the lower alkyl groups, i.e., those having from 1 to about 6 carbon atoms, such as ortho and meta cresol, 2,6-dimethylphenol, methyl xylenol, tetramethylphenol, 2-methyl 6-tert-butylphenol and the like, with aldehydes is efficiently catalyzed by cationic exchanging acid groups on the resin.

Any substantially pure saturated aliphatic or aromatic aldehydes can be condensed with the above phenols by the process of our invention. There is no known intrinsic upper limitation on the size of the aldehyde compound and so that if pure reactants are used bisphenols can be obtained with all aldehydes. The availability of long chain aldehydes is quite limited, however, from an economic standpoint aldehydes containing from 2 to 12 carbon atoms such as alkyl and cycloalkyl aldehydes; the alkyl or halogen-substituted cycloalkyl aldehydes; and the alkyl or halogen-substituted phenyl aldehydes are practically suitable.

It is necessary in the process of this invention to utilize more than stoichiometric amounts of phenol to aldehyde in the reaction zone. Generally at least 3 moles and up to about 20 moles of phenol per mole of aldehyde is suitable. It is preferred, in order to achieve higher conversions and greater efficiency, to employ mole ratios of phenol to aldehyde between about 6:1 and 12:1. The reaction of the phenol and aldehyde to the corresponding bisphenol with the cationic exchange resin catalysts hereinbefore described is preferably accomplished by contacting a mixture of a phenol and an aldehyde, containing 6 to 12 moles of phenol per mole of the aldehyde, with an amount of phenol modified-ion exchange resin catalyst sufficient to provide 1 mole equivalent of acid per mole of aldehyde at a temperature between 65° and 95° C., for a time sufficient to yield at least a 50% conversion of the reactants to bisphenol. The time during which the reactants are in contact with the catalyst, or the residence time, determines the percent conversion for a given resin.

Residence time and temperature of reactants being equal, different ion exchange resins, having equivalent exchange potential and an equal number of available milliequivalents of acid per gram, provide equal yields of bisphenol.

The bisphenol product can be recovered after part or all of the aldehyde has been reacted by separating the insoluble cationic exchanging resin, e.g., by filtering. The ion exchange resin catalyzed process of our invention can easily be adapted to continuous operation by passing the mixture of phenol and aldehyde through a fixed or moving bed of resin catalyst, removing the product and water of reaction after each cycle, adding additional reactants and recycling. The rate of flow of reactants and desired conversion per pass is determined by the residence time of the reactants in contact with the insoluble catalyst.

The ion exchange resin of this invention is generally effective at moderate temperatures of about 40° to 100° C. Temperatures above 100° C. are not necessary or particularly advantageous since the rate of by-product formation appears to increase rapidly above this temperature and no corresponding increase in rate of bisphenol production or total bisphenol yield occurs. At temperatures above 100° C., it is also possible that some of the polymeric catalysts could be degraded, significantly lowering their useful life.

Continuous operation in a column containing a fixed resin bed is most satisfactorily run at temperatures in the range of 70° to 98° C. High conversions of phenol and aldehyde to bisphenol are not easily obtained at temperatures below 65° C. due to the crystallization of phenol in the system which causes plugging of the column. Lower temperatures, down to about 40° C. are satisfactory for batch production methods, however.

Pressure does not appear to be critical in the process of this invention and, while atmospheric pressure is most convenient, either superatmospheric or subatmospheric pressures can be employed where desired. The resistance to flow offered by the tightly packed bed used in continuous column operations necessitates a somewhat greater pressure at the inlet of the column than is present within the column itself.

The recovery of the bisphenol product with our process is easy and can be achieved in several ways. In batch or continuous operations the bisphenol product can be separated, for example, by filtering the reaction mixture to remove the catalyst at a temperature above about 65° C. To recover the bisphenol or phenol-bisphenol complex crystals the catalyst-free filtrate is cooled to about 40° C. to 65° C., the crystalline bisphenol or bisphenol complex is filtered off and distilled to yield a dry, recyclicable phenol distillate and a bisphenol residue having a purity of 95% or better. Some bisphenol, phenol and most of the resinous reaction by-products remain in the filtrate and are recoverable by recycling, distillation, crystallization or other suitable means.

The following examples are illustrative:

Example 1

An equivalent weight (206 grams calculated from the number of milliequivalents per dry gram) of a sulfonated copolymer of divinyl benzene and styrene ion exchange resin was freed of water by azeotropic distillation conducted by adding 2000 grams of phenol to the ion exchange resin, heating the mixture to 95° C. for about one hour at 20 mm. Hg pressure and distilling off the water together with the water-phenol azeotrope. The remaining phenol-catalyst slurry was filtered and the dehydrated catalyst, containing about 30 percent by weight of phenol, was mixed with phenol and isobutyraldehyde, in a molar ratio of 6:1, in such proportion that approximately 1 mole equivalent (206 g.) of dry Dowex 50 X–4 was available per mole (72 g.) of aldehyde. The mixture was heated for four hours at 75° C. The catalyst was filtered off. The excess phenol and water of reaction were removed by distillation to residue temperature of 200° C. at a reduced pressure of 0.5 mm. Hg. The yield of residue crude product based on the amount of isobutyraldehyde added, and calculated as bisphenol, was 90–95%. After recrystallization from toluene, a 50–60% yield of the crystalline bisphenol of isobutyraldehyde, [1,1-bis (p-hydroxy phenyl)isobutane], (M.P. 153°–154.8° C.) was obtained. Reusing this catalyst 10 times did not diminish its effectiveness or yields produced.

Example 2

Additional batch reactions were carried out in the above-described manner except that the temperature and/or the reaction time and/or the amount of water in the reaction mixture and/or the mole ratios of the reactants were varied, as indicated in Table I below.

TABLE I.—PREPARATION OF THE BISHPENOL OF ISOBUTYRALDEHYDE

| Exp. | Mole Ratio, Phenol Isobutyraldehyde | Temp., °C. | Time, Hrs. | Conc. of $H_2O$ at start | Percent Conv. of aldehyde | Percent Bisphenol |
|---|---|---|---|---|---|---|
| A | 6:1 | 95 | 4 | Anhydrous | 88 | 44 |
| B | 6:1 | 75 | 4 | ----do---- | 90 | 55 |
| C | 6:1 | 65 | 4 | ----do---- | 88 | 54 |
| D | 12:1 | 95 | 4 | ----do---- | 90 | 50 |
| E | 12:1 | 75 | 4 | ----do---- | 95 | 52 |
| F | 12:1 | 65 | 4 | ----do---- | 93 | 58 |
| G | 6:1 | 75 | 2 | ----do---- | 85 | 50 |
| H | 6:1 | 75 | 1 | ----do---- | 84.3 | 46.8 |
| I | 6:1 | 75 | 0.25 | ----do---- | 82 | 48.2 |
| J | 6:1 | 75 | 4 | 1% | 87 | 56.5 |
| K | 6:1 | 75 | 4 | 2% | 86 | 58 |
| L | 6:1 | 75 | 4 | 5% | 88 | 56.5 |

A comparison of A, B and C indicates that increasing temperatures do not substantially affect the percent conversion of aldehyde but will decrease the yield of crystalline bisphenol. In D, E, and F an increase in the molar ratio of phenol to aldehyde increased the percent conversion, but slightly reduced the bisphenol yield when compared with A, B, and C. A reduction in residence time of the reactants is directly reflected in percent aldehyde conversion and yield of bisphenol except that the 15 minute reaction product contained a higher percentage of the bisphenol. The non-criticality of the water content is demonstrated in J, K and L wherein the data on percent conversion and yield of bisphenol are nearly equivalent and compare very favorably, particularly in bisphenol yield, with the results of reactions which were anhydrous at the start.

The yields of bisphenol can be improved by recycling the by-products of the reaction. This is shown by the following data.

The mother liquors from the crystallization of crude bisphenols obtained from several runs listed in Table I were collected and evaporated under vacuum (15 mm. Hg) to a solvent-free residue. This residue was redissolved in an equal weight of toluene and again allowed to crystallize to obtain a yield of about 10% by weight of crystalline material which was filtered off and the filtrate freed of solvent. 200 grams of the solvent-free residue was mixed with 1000 grams of phenol and 250 grams of phenol treated Dowex 50X-4. This reaction mixture was heated 4.5 hours at 75°-80° C., and filtered free of catalyst. The excess phenol was removed from the filtrate by distillation to a residue temperature of 200° C. at 0.5 mm. Hg. The residue was dissolved in an equal weight of toluene, and allowed to crystallize, whereby 30 grams of crystalline bisphenol of isobutyraldehyde (M.P. 153°-154° C.) was obtained. This is a 15% conversion of the by-products to the bisphenol. From this example it is apparent that under continuous reaction conditions, the amount of by-product resin would reach constant or steady state conditions, and reaction efficiencies would approach 100%.

*Example 3*

A 2-liter, 3-necked flask was equipped with a mechanical stirrer, thermometer and reflux condenser. To the flask were added 250 grams of the phenol-modified Dowex 50X-4 prepared as in Example 1, and 846 grams (9 mols) of phenol and 108 grams (1.5 mols) of n-butyraldehyde yielding a 6:1 phenol n-butyraldehyde molar ratio. The mixture was heated to 75° C. with constant stirring for 4 hours. The reacted mixture was separated from the catalyst by filtration and the filtrate was distilled at 0.1 mm. Hg pressure until a residue temperature of 200° C. was attained.

The residue yield of crude bisphenol of n-butyraldehyde was 294 grams, corresponding to an 81% yield based on the grams of n-butyraldehyde added. Recrystallization of crude product from about one-half its weight of toluene gave a snow white bisphenol, having a molecular weight of 244 g. (M.P. 138-138.8° C.). Over 48% of the crude product was crystalline giving a yield of crystalline bisphenol of n-butyraldehyde, [1,1 bis(p-hydroxyphenyl)butane], of 40% based on the aldehyde used.

*Example 4*

To apparatus set up as in Example 3 were added 250 grams of phenol-modified Dowex 50X-4 prepared as in Example 1, 846 grams (9 mols) of phenol, and 150 grams (1.5 mols) of benzaldehyde (a 6:1 phenol/benzaldehyde molar ratio).

After heating the mixture to 75° C. with stirring for two hours, the reaction product was separated from the catalyst filtration and the filtrate distilled under 0.1 mm. Hg pressure until a residue temperature of 200° C. was reached. The crude residue product obtained was light orange in color and weighed 365 grams which corresponds to an 88.2% yield based on the benzaldehyde added. After recrystallization from an equal weight of toluene, tan crystals, weighing an amount corresponding to a 70% yield based on the benzaldehyde, were obtained. 79% of the crude product was crystalline bisphenol of benzaldehyde (4,4'-dihydroxy triphenyl methane) M.P. 161-162° C.

*Example 5*

A mixture containing 112.8 grams (12 mols) of phenol per 106.1 grams (1 mole) of benzaldehyde was continuously circulated by means of a Zenith gear pump through a fixed bed of 500 grams of Dowex 50X-4, modified with phenol as in Example 1 contained in a 1″ dia. 5 ft. long glass tube. Residence time per cycle of the reactants in the catalyst bed was 15 minutes at a temperature of 75° C. The run was continued for 5 hours. The yield of crude product based on the 106.1 grams of benzaldehyde added was 264 grams, corresponding to a 95.5% yield of the bisphenol of benzaldehyde. Recrystallization of the crude product from toluene yielded 204 grams corresponding to a 73% yield of the bisphenol of benzaldehyde based on the aldehyde added (M.P. 161-162° C.).

*Example 6*

To a 1-liter, 3 neck, round bottom flask equipped with mechanical stirrer, thermometer and reflux condenser was added 210 grams of phenol-modified Dowex 50X-4 cation exchange resin (0.5 equivalent) and a 6:1 phenol-undecylaldehyde molar ratio mixture (282 grams of melted phenol and 81 grams of undecylaldehyde) and heated to 75-80° C.

The reaction is exothermic and cooling water was necessary at the beginning to maintain the desired 75-80° C. The mixture was kept at 75-80° C. for five hours with agitation at the end of the reaction period. The reacted mixture was separated from the insoluble catalyst by filtering through a sintered glass funnel. The reacted mixture was then distilled to 200° C. and 0.5 mm. Hg pressure.

The crude residue yield was 144 grams or a 90% yield, based on the aldehyde. The bisphenol was a brittle, non-crystalline material at room temperature. No crystals could be obtained on recrystallization from an equal weight of toluene or glacial acetic acid.

Acetylation, however, of the resinous crude bisphenol gave 9.2% hydroxyl value, compared to a 10% theoretical value based on the bisphenol of undecylaldehyde.

What is claimed is:

1. A process for the production of bisphenols from a phenol reactive in the para position and a saturated aldehyde which comprises contacting a mixture comprising said phenol and an aldehyde in a molar ratio of more than 2 to 1 with catalytic quantities of a cation exchanging resin at a temperature of less than about 100° C.

2. A process for the production of bisphenols from a phenol and an aldehyde which comprises contacting a mixture comprising a phenol having a reactive hydrogen in the ring position para to the phenolic hydroxyl and an aldehyde free from olefinic unsaturation in a molar ratio of at least 3 to 1 with catalytic quantities of a cation exchanging resin at a temperature between about 40° C. and 100° C.

3. A process for the production of bisphenols from a phenol and an aldehyde which comprises contacting a mixture comprising a phenol having a reactive hydrogen in the ring position para to the phenolic hydroxyl and an aldehyde free of olefinic unsaturation in a molar ratio of from 6:1 to 12:1 with an amount of cation exchanging resin sufficient to provide at least 1 mole equivalent of resin per mole of the aldehyde at a temperature between about 40° C. and 100° C.

4. The process claimed in claim 3 wherein the cation exchanging resin is anhydrous.

5. The process claimed in claim 3 wherein the cation exchanging resin is saturated with phenol per se.

6. A continuous process for the production of bisphenols from a phenol and an aldehyde which comprises forming a mixture of a phenol having a reactive hydrogen in the ring position para to the phenolic hydroxyl and an aldehyde free of olefinic unsaturation in a molar ratio of at least 3 to 1, contacting said mixture with a cation exchanging resin saturated with said phenol in a reaction zone maintained at a temperature between about 65° C. and 95° C., drawing off the bisphenol product and the unreacted phenol and aldehyde, separating the bisphenol therefrom, recharging the phenol aldehyde mixture with additional phenol and aldehyde, and again contacting said mixture with said cation exchanging resin.

(References on following page)

References Cited by the Examiner

UNITED STATES PATENTS

| | | |
|---|---|---|
| 2,468,982 | 5/1949 | Jansen. |
| 2,494,758 | 1/1950 | Hartough et al. ____ 260—619 X |
| 2,498,656 | 2/1950 | De Groote et al. |
| 2,499,361 | 3/1950 | De Groote et al. |
| 2,628,983 | 2/1953 | Aller et al. _____ 260—621 |
| 2,675,366 | 4/1954 | Pullman _____260—619 X |

OTHER REFERENCES

"Amberlite Ion Exchange," p. 10. (1 page), pub. by Rohm & Haas Co., The Resinous Products Division, Washington Square, Philadelphia (Sept. 1953).

Kunin et al., "Ion Exchange Resins," pp. 137–139 (3 pages), pub. by John Wiley & Sons, Inc., New York (1950).

LEON ZITVER, *Primary Examiner.*

CHARLES B. PARKER, *Examiner.*